UNITED STATES PATENT OFFICE.

HEINRICH SCHLINCK, OF LUDWIGSHAFEN-ON-THE-MAIN, GERMANY.

PURIFYING FATTY OILS AND FATS.

SPECIFICATION forming part of Letters Patent No. 278,187, dated May 22, 1883.

Application filed November 23, 1882. (No specimens.)

*To all whom it may concern:*

Be it known that I, HEINRICH SCHLINCK, a citizen of Germany, residing at Ludwigshafen-on-the-Main, Germany, have invented certain new and useful Improvements in Purifying Fatty Oils and Fats, of which the following is a specification.

My invention has for its object the purification of fats and oils which, originally palatable, have acquired an obnoxious taste, odor, or color, either by long-continued storage or by an irrational production.

To this end my invention consists in the following process: I first wash the fats and oils with alcohol of at least 96° Tralles, by preference in iron stirring-vessels. The washing operation may be repeated, and it is conducted most successfully at a temperature of 45° centigrade. The alcohol is separated from the oil and fat by allowing the mass to subside in proper vessels. The alcohol contained in the oil or fat is distilled off, the last traces being driven off by dry steam. The alcohol which contains the oily and fatty acids and such ethereal oils as may be present is separated from these by distillation, the oily and fatty acids forming a valuable by-product. The air which enters the retorts when the same are being emptied must be dry. If, after having been treated with alcohol, as above stated, the oils and fats still show an obnoxious taste or odor, due to the presence of ethereal oils which are not, or not completely, extracted by the alcohol, I then subject the oil to heat from 110° to 175° centigrade in suitable vessels, wherein it is treated with aqueous vapors or steam heated to the same temperature, the height of temperature depending upon the boiling-point of the ethereal oils contained in the fats or oils. This action of heat and steam is continued until the escaping steam no longer gives off any odors of the oils, after which the fats are filtered through bone-black. In most cases this is not required, and the oil or fat, after having been washed with alcohol, can be brought directly upon the bone-black filter, whence it runs off in a palatable and odorless condition.

What I claim as new, and desire to secure by Letters Patent, is—

The within-described process of purifying oils and fats by first treating them with alcohol, and then filtering the same through bone-black.

In testimony whereof I have signed my name to this specification in the presence of two subscribing witnesses.

HEINRICH SCHLINCK.

Witnesses:
J. LUMDRU,
J. ENGLERT.